Dec. 25, 1923.

F. H. KINYOUN

AIRPLANE STARTING AND LANDING DEVICE

Filed June 14, 1923    2 Sheets-Sheet 1

1,478,747

Inventor
F. H. Kinyoun
By Philip A. H. Sewell
Attorney

Patented Dec. 25, 1923.

1,478,747

UNITED STATES PATENT OFFICE

FLOYD H. KINYOUN, OF OMAHA, NEBRASKA.

AIRPLANE STARTING AND LANDING DEVICE.

Application filed June 14, 1923. Serial No. 645,291.

*To all whom it may concern:*

Be it known that FLOYD H. KINYOUN, a citizen of the United States, residing at Omaha, in the county of Douglas and State of Nebraska, has invented certain new and useful Improvements in Airplane Starting and Landing Devices, of which the following is a specification, reference being had therein to the accompanying drawings.

The invention relates to airplane starting and landing devices, and has for its object to provide a device of this character comprising a turn table having an endless belt mounted thereon and guidable in triangularly shaped trackways. The turn table is provided with an electric motor for driving the endless belt on which the airplane rests; the motor also forming means by which the turn table can be turned to various positions for receiving or launching an airplane.

A further object is to provide supporting rollers beneath the horizontal portion of the endless belt for supporting the same and the airplane resting thereon. Also to provide a belt tightener for the endless belt.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
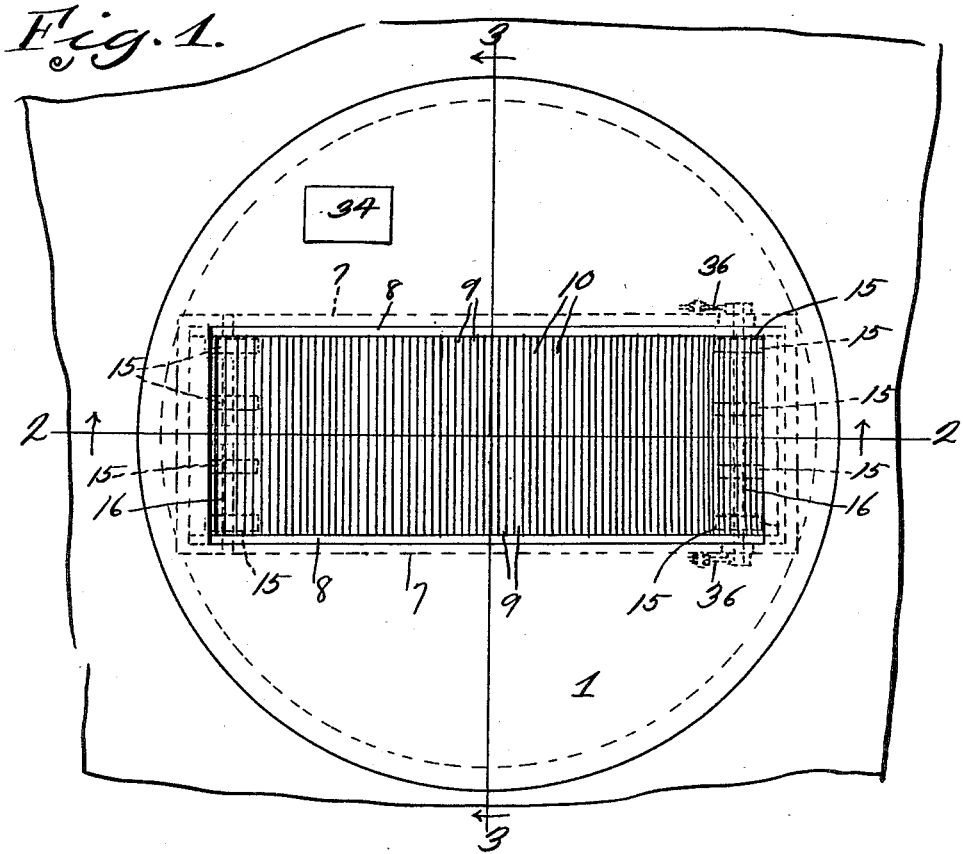
Figure 1 is a top plan view of the device.
Figure 2:
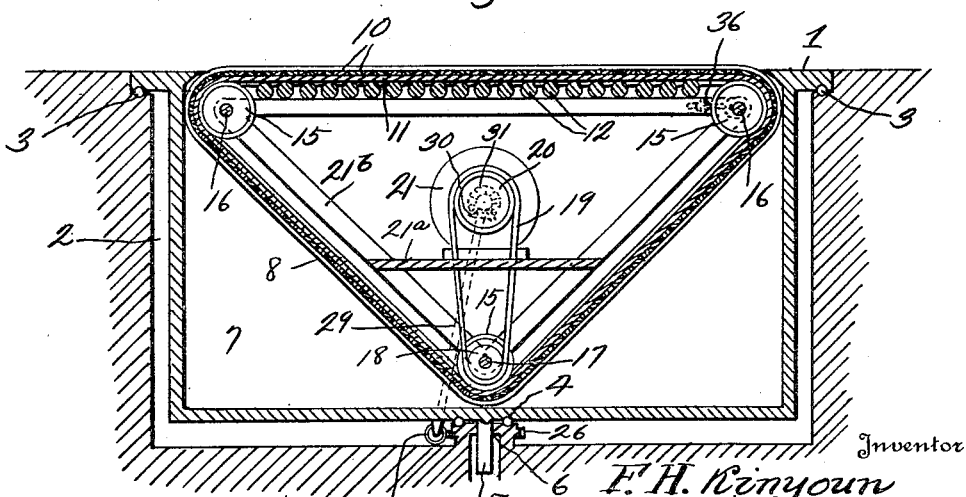
Figure 2 is a vertical transverse sectional view through the device taken on line 2—2 of Figure 1.
Figure 3:
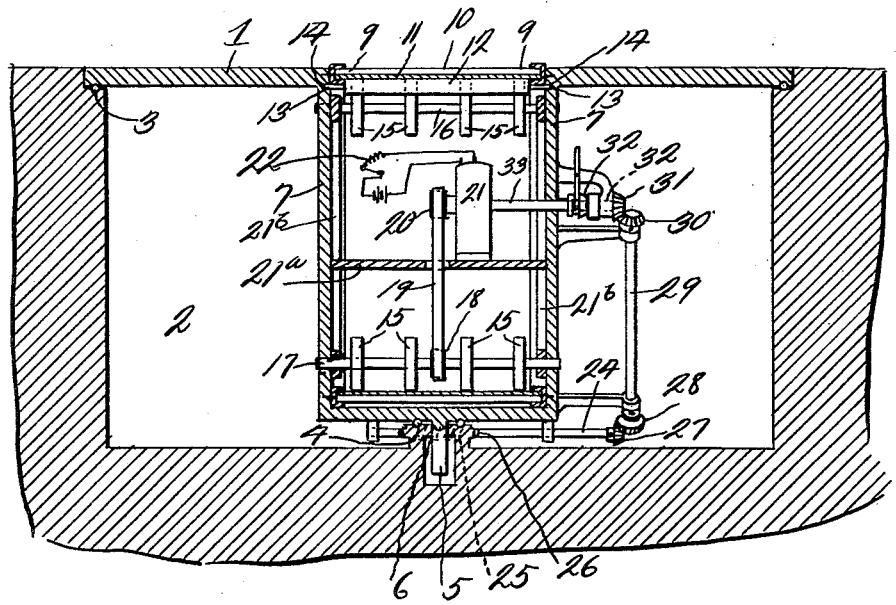
Figure 3 is a vertical transverse sectional view through the device taken on line 3—3 of Figure 1.

Referring to the drawing, the numeral 1 designates the turn table, which turn table is disposed in a pit 2, and is preferably supported on antifrictional bearings 3 and 4 at its upper and lower ends. Extending downwardly axially from the turn table 1 is a pivot pin 5, which is rotatably mounted in a bearing 6, carried by the bottom of the pit 2. It has been found extremely difficult to launch airplanes or land the same in a relatively small space, and to accomplish this result the device is primarily designed. Extending longitudinally of the turn table 1 are spaced walls 7, which walls are vertically disposed, and have secured thereto triangularly shaped tracks 8, formed from channelled members, and in which tracks the ends 9 of transversely disposed slats 10 carried by the endless flexible belt 11 are disposed. The edges of the belt 11 are also disposed in said tracks 8, thereby thoroughly supporting the endless belt during its movement. However to thoroughly support the horizontal portion of the endless belt transversely disposed rollers 12 are provided, which rollers have their pintles 13 rotatably mounted in bearings 14 of the walls 7, therefore it will be seen that the belt will not sag under the weight of an airplane disposed thereon. The belt 11 extends over spaced pulleys 15 carried by transversely disposed shafts 16 and 17, which shafts have bearings in the walls 7. Shaft 17 is provided with a pulley 18, which pulley is driven by a belt 19, which extends upwardly over a pulley 20, which is driven by the electric motor 21 mounted on a platform 21$^a$ carried by triangular braces 21$^b$, therefore it will be seen that a continuous rotation of the endless belt may be obtained at a high speed if so desired. The motor is in circuit with a battery or other source of supply and a rheostat 22, by means of which rheostat the speed of operation of the motor may be varied. It is often necessary to rotate the turn table for properly positioning the endless belt for receiving an airplane or starting one. For instance the aviator comes down slowly and against the wind landing on the ground a short distance from the landing device. Under these conditions the operator of the landing device operates the turn table, thereby adjusting the apron or endless belt platform for a proper entrance of the airplane. At this time the endless belt is running at a high rate of speed in an opposite direction to the movement of the plane, thus retarding the forward movement of the planes and bring it to a standstill. In launching an airplane, the endless belt, after the airplane has been placed thereon is slowly started in the opposite direction to the direction of winding. The speed of both the airplane and endless belt are increased, until both are running at a very high rate of speed, in this manner, the plane mechanism gains sufficient momentum to enable the aviator to make the ascent.

To revolve the turn table to various positions, a shaft 24 is provided on the underside of the turn table which shaft is provided with a worm 25, which cooperates with a worm gear 26 carried by the bottom of the pit 2. The outer end of the shaft 24 is provided with a bevelled gear 27, which meshes with a bevelled gear 28 carried by the upwardly extending shaft 29 of the turn table 1. The upper end of the shaft 29 is provided with a bevelled gear 30, which meshes with the bevelled gear 31, which is mounted on the end of the shaft 32, and which is controlled by a lug 32, carried by the motor shaft 33, and by means of which clutch the rotation of the turn table as a whole may be accomplished. The controlling mechanism as a whole is preferably disposed within the pit 2 and to which pit access may be had by removing the door 34.

From the above it will be seen that an airplane launching and landing device is provided, which is simple in construction and positive in its operation. It will also be seen that by means of belt tighteners 36, any slack which may develop in the belt will be easily taken up.

The invention having been set forth what is claimed as new and useful is:—

1. An airplane starting and landing device, said device comprising a turn table, said turn table being mounted on bearings within a pit, a triangularly arranged endless belt carried by said turn table and having a horizontal portion thereof substantially flush with the upper side of the turn table, the opposite edges of said endless belt being slidably mounted in triangular shaped channels, transversely disposed shafts, spaced pulleys carried by said shafts, transversely disposed supporting rollers engaging the under side of the endless belt, means whereby said turn table may be rotated to various positions, means for rotating one of the transversely disposed shafts for imparting movement to the endless belt, said turn table rotating means and shaft rotating means being from the same source of power.

2. An airplane starting and landing device, said device comprising a turn table disposed in a pit, an endless belt mounted within said turn table and having transversely disposed slats, the opposite sides of said belt being slidably mounted in channels, said belt extending over shaft carried pulleys, a motor for driving said endless belt and mounted on the turn table, a worm gear disposed in the bottom of the pit beneath the turn table and shaft and gear connections between the motor and the worm gear whereby said turn table may be rotated to various positions.

In testimony whereof I hereunto affix my signature.

FLOYD H. KINYOUN.